United States Patent [19]
Blümke et al.

[11] Patent Number: 5,146,516
[45] Date of Patent: Sep. 8, 1992

[54] OPTOELECTRICAL SENDING AND RECEIVING APPARATUS

[75] Inventors: Thomas Blümke, Bohrenbach; Jürgen Röckle, Krichheim, both of Fed. Rep. of Germany

[73] Assignee: Richard Hirschmann GmbH & Co., Fed. Rep. of Germany

[21] Appl. No.: 559,969

[22] Filed: Jul. 30, 1990

[30] Foreign Application Priority Data

Jul. 28, 1989 [DE] Fed. Rep. of Germany ....... 3925128

[51] Int. Cl.$^5$ ................................................. G02B 6/34
[52] U.S. Cl. ....................................... 385/36; 385/47; 385/48
[58] Field of Search ................ 350/96.15, 96.16, 96.18, 350/96.19, 96.2; 385/28, 29, 31, 36, 47, 48

[56] References Cited

U.S. PATENT DOCUMENTS

| | | | |
|---|---|---|---|
| 4,154,529 | 5/1979 | Dyott | 350/96.18 X |
| 4,381,137 | 4/1983 | Berg et al. | 350/96.18 |
| 4,423,922 | 1/1984 | Porter | 350/96.15 |
| 4,737,004 | 4/1988 | Amitay et al. | 350/96.15 |
| 4,767,171 | 8/1988 | Keil et al. | 350/96.18 |
| 4,993,796 | 2/1991 | Kapany et al. | 350/96.15 |

FOREIGN PATENT DOCUMENTS

| | | |
|---|---|---|
| 0238977 | 9/1987 | European Pat. Off. . |
| 0268523 | 5/1988 | European Pat. Off. ......... 350/96.19 |
| 3716772 | 12/1988 | Fed. Rep. of Germany . |
| 53106503 | 9/1978 | Japan . |
| WO88/09944 | 12/1988 | PCT Int'l Appl. . |
| 2164763 | 3/1986 | United Kingdom . |

OTHER PUBLICATIONS

R. Betts, *Fiber-Optic Transmit/Receive Coupler*, IBM Technical Disclosure Bulletin, vol. 20, No. 11B, pp. 4763-4764, Apr. 1978.

*Primary Examiner*—John D. Lee
*Attorney, Agent, or Firm*—Robert J. Koch

[57] ABSTRACT

A sender/receiver apparatus configured for a bi-directional beam wave guide may be configured with an optical prism. the device can be placed in a housing with a wave guide socket connected at an optical port. Spherical lenses and an internal wave guide may be located between the prism and the optical port, the sender and the receiver, respectively. The prism may exhibit an aperture reflecting surface or diaphragm.

35 Claims, 2 Drawing Sheets

OPTOELECTRICAL SENDING AND RECEIVING APPARATUS

BACKGROUND OF THE INVENTION

1. Field of the Invention

The invention relates to an optoelectric sending and receiving apparatus for a bi-directional beam waveguide with a sender and a receiver.

2. Description of the Related Technology

DE 37 16 772 shows an optoelectrical sending and receiving apparatus. An electro-optical sender, for example a light emitting diode, and an optoelectronic receiver, for example a photodiode, are placed coaxially above each other. Coaxially located beam wave guides are located between this sender and receiver layout and a beam wave guide connecting section A hollow cylindrical beam wave guide is optically coupled to the receiver and a cylindrical beam wave guide is coupled to the sender. Special, non commercial sender and receiver semiconductors and specially adapted beam wave guides are required. The wave guides add significant expense to the apparatus. In addition, this known sender and receiver apparatus has the disadvantage that high values of the return loss $\alpha$ between the sender and the receiver cannot be obtained with the connection sector inserted because a gap must be maintained between the frontal surfaces of the coaxially located beam wave guides facing the beam wave guide terminal surface for the sender and the receiver, and the terminal surface of the beam wave guide connecting sector. Return loss values higher than 20 to 25 dB cannot be obtained due to geometry dependent conditions. However, the application of optoelectronic sender and receiver apparatus in transmission systems requires return losses higher than 35 dB.

Taper coupler configurations with fiber connectors are known. Mounting of plugs on these connectors reflections appear at the glass air transitions in the plug when mounted on these connectors. The reflections arrive by a branching point at the receiver. Such known configurations are not suitable for most applications.

Another possibility consists of the use of branching points which operate in a wave length selective manner and are equipped with connectors for beam wave guide plugs. No uniform terminal devices are possible with these configurations. Two emitter diodes with different wave lengths are required, thereby increasing the expense of the solution.

SUMMARY OF THE INVENTION

It is an object of the invention to provide an optoelectric sender and receiver apparatus for the beam wave guide connection sector with a sender and a receiver, which has a simple configuration and allows nearly any return loss with the beam wave guide connection sector connected.

The object is attained according to the invention by a mode selective brancher provided for separation of a beam bundle bidirectionally transmitted on a common beam wave guide connecting sector. In addition to a very simple configuration, with the sender and receiver apparatus according to the invention an essentially unlimited return loss may be obtained at existing glass-air transitions. The coupling of the sender and receiver apparatus to any plug connectors is further possible without problems. Another advantage is that any commercially available sender element may be used for the sender and receiver apparatus of the invention.

According to a preferred embodiment of the invention the brancher comprises a solid angle range for beam emission and reception, assigned to the sender and receiver. The mode selection between beams to be sent and received in this embodiment therefore takes place over different solid angle ranges.

The sender and receiver solid angle ranges are preferably rotationally symmetric relative to each other, although other types of symmetry or relationships are possible in principle.

Optical elements may be used to establish the two solid angle ranges for the sending and receiving of beams. The optical elements may be diaphragms and/or lenses.

It is particularly advantageous if at least one of the optical structural elements has a reflecting surface and, at least one of the beams is reflected. According to an especially advantageous embodiment of the invention an optical prism is provided to form the sender receiver solid angle ranges. The optical prism has a reflecting surface with a non-reflecting area. According to this configuration the reflecting surface is a surface with total reflection for at least one incident beam. The reflecting surface has both a reflecting and a non reflecting area.

If an optical prism is provided, one cathetus surface of the prism may face a sender and the other cathetus surface may face a terminal surface of the beam wave guide. The hypotenuse surface may face the receiver. The hypotenuse surface has the reflecting surface with a non reflecting area. The reflective surface, with the exception of non-reflecting area, reflects one of the two beams onto the terminal surface of the beam wave guide connecting sector.

The hypothenuse surface preferably has a reflecting layer with an aperture for the beam received Alternatively, the non-reflecting area may be formed by an optical element cancelling the total reflection of the reflecting surface.

It is particularly advantageous if the optical prism is an isosceles optical prism, while in certain applications a non-isosceles prism may be used. However, the isosceles optical prism has the advantage that the solid angle ranges obtained with it for the separation of the bi-directionally transmitted beams may be produced in a simple and unambiguous manner.

It is advantageous to provide a lens between the sender and the cathetus surface of the optical prism facing the sender. The lens may convert the beam coming from the sender into an essentially parallel beam.

The non reflecting area or the orifice of the reflecting layer is advantageously coaxial with the essentially parallel beam coming from the sender. This yields a good symmetry of the beams and a low loss of light in the brancher.

It is advantageous to provide a lens between cathetus surface of the optical prism facing the terminal surface of the beam wave guide connecting sector and the terminal surface of said sector. The lens may focus the reflected, essential parallel, beam emitted by the sender on to the terminal surface of the beam wave guide connecting sector and converts the beam coming from the terminal surface of the beam wave guide terminal surface into an essentially parallel beam. The luminous yield of such a layout is especially high.

Advantageously, at least one of these lenses may be a spherical lens.

In an alternative embodiment of the invention a beam wave guide is provided between the non reflecting area or the aperture of the reflecting layer and the receiver. Preferably, the beam wave guide may be essentially the same index as the prism.

It is advantageous in practice to house the optoelectrical sender and receiving apparatus in a common casing with sockets for the plug connection of the beam wave guide connecting sector. This configuration results in a compact, robust apparatus that is independent of environmental illuminating conditions.

The invention will be more apparent from the following examples set forth by reference to the drawing.

DETAILED DESCRIPTION OF THE PREFERRED EMBODIMENT

A beam wave guide connecting sector 2 is provided as a bi-directional transmission media for optical signals. The connecting sector exhibits a terminal or frontal surface 1. Beams are reflected (emitted) from the surface 1 and impact (transmitted to) the surface 1.

Figure 1:
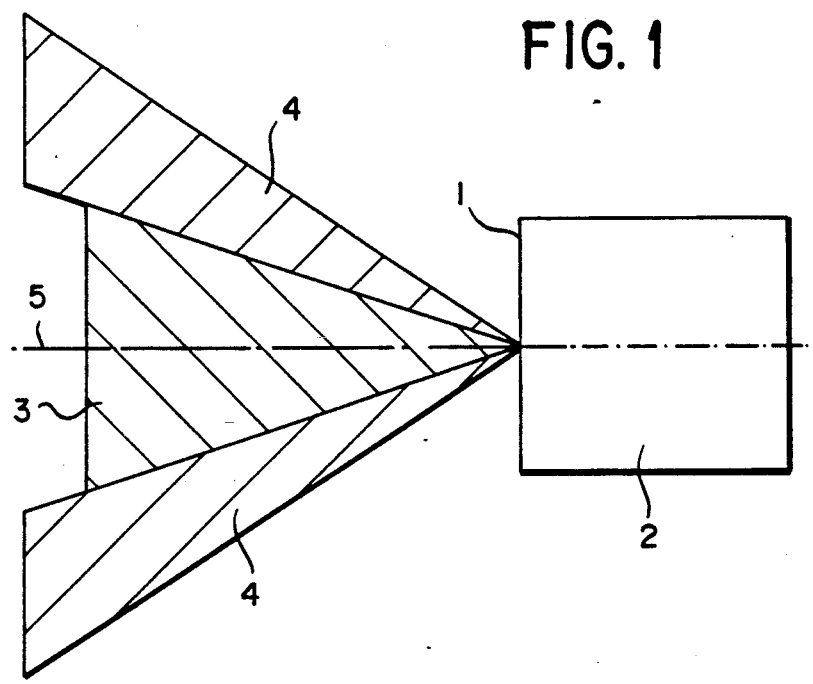
FIG. 1 shows a systematic view of the solid angle ranges to explain the principle of the invention.

As schematically shown in FIG. 1, the entire solid angle range corresponding to the beam path traversing or impacting the frontal surface 1 is divided into two solid angle areas 3, 4. The solid angle areas may be rotationally symmetric relative to the axis 5 of the beam wave guide connecting sector 2. The separation of the solid angle areas 3 and 4 is carried out by optical structural elements, such as lenses and/or diaphragms, as explained in more detail below. A beam coming from the sender is introduced into the beam wave guide connecting sector 2 through one of the solid angle areas 3 or 4 and a beam is outputed by the beam wave guide connecting sector 2 onto the receiver through the other solid angle area 4 or 3.

Figure 2:
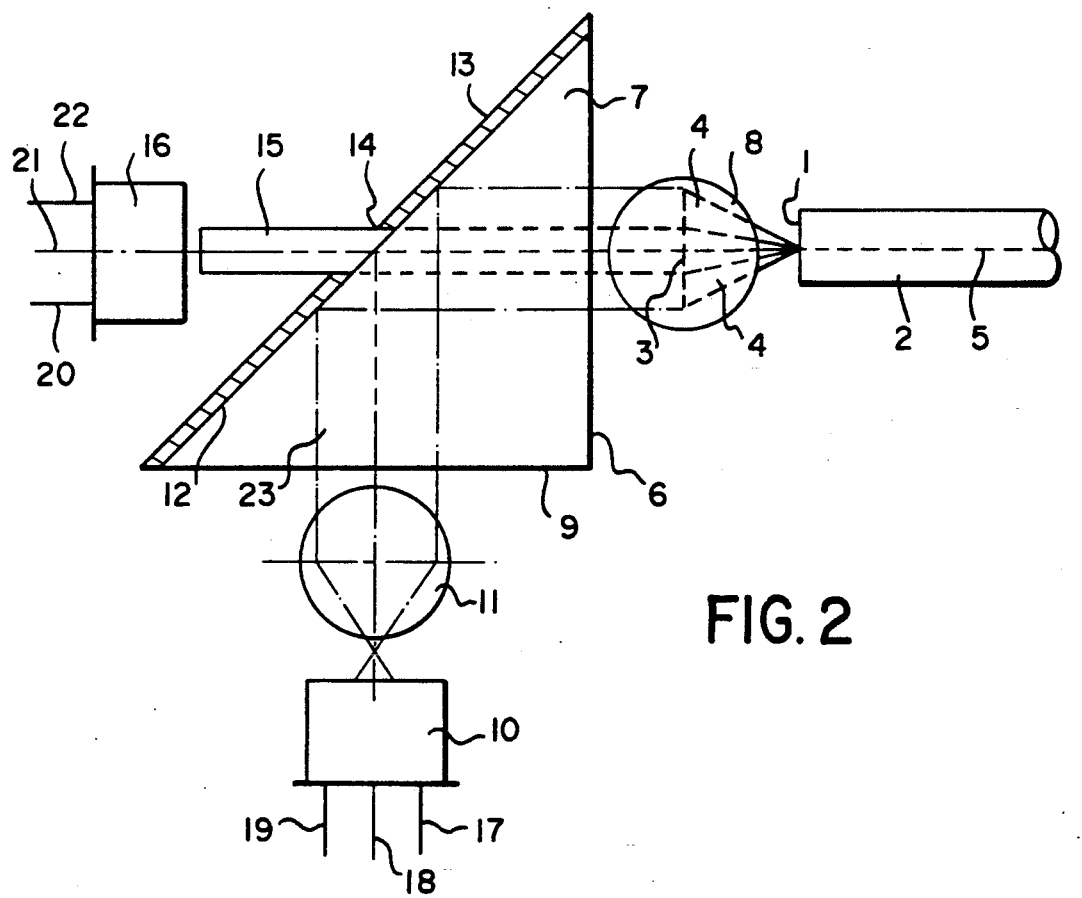
FIG. 2 shows a schematic view of an embodiment of the apparatus according to the invention.

FIG. 2 shows detailed view of the principle of the invention schematically illustrated in FIG. 1, using schematic representations of optical elements.

A first spherical lens 8 is located between the terminal surface 1 of the beam wave guide connecting sector 2 and a cathetus surface 6 of an optical prism 7. A second spherical lens 11 is provided between the other cathetus surface 9 of the prism 7 and a sender 10. A reflecting layer 13 is present on the hypotenuse surface 12 facing away from the two spherical lenses of the optical prism 7. The reflecting layer 13 has an aperture 14, which lies in the beam transmission path of the wave guide and advantageously is coaxial with the axis 5 of the beam wave guide connecting sector 2. This diaphragm aperture 14 is followed by a beam wave guide 15 with essentially the same calculated index as the prism. The beam wave guide 15 is again preferably coaxial with the axis 5 of the beam wave guide connecting sector 2. In the area of the diaphragm aperture the total reflection is cancelled out by the beam wave guide mount, so that the light incident on this area is not reflected.

The sender 10, which for example may be a light emitting diode, has electrical connections, 17, 18, 19.

The receiver 16, which serves as a detector, may be a photodiode with electrical connections 20, 21, 22. The sender 10 receives electrical signals to be converted into optical signals through connections 17, 18, 19. The connections, 20, 21, 22 of the receiver 16 conduct the electrical signals produced by the receiver from the incident optical signals.

The beam produced by the sender 10 is expanded in the second spherical lens 11 into a parallel beam 23, reflected by the reflecting layer 13 of the prism 7 in the range corresponding to the solid angle 4 onto the first spherical lens 8 and from there focused in the solid angle range 4 onto the terminal surface 1 of the beam wave guide connecting sector 2. No light from the sender 10 appears in the solid angle area 3 because no reflections of the parallel beam coming from the sender 10 or the first spherical lens 8 takes place in the area of the aperture 14.

The light reflected by the terminal surface 1 of the beam wave guide connection sector 2 is aligned parallel by the first spherical lens 8 and impacts the reflecting layer 13 and the diaphragm aperture 14. The light received is conducted in the area of the aperture 14 through the beam wave guide 15 to the receiver 16.

No light coming from the sender 10 appears in the inner solid angle area 3. Therefore the return loss $a_R$ on the apparatus according to the invention is particularly high. In principle, this leads to an unlimited return loss of the apparatus according to the invention.

Figure 3:
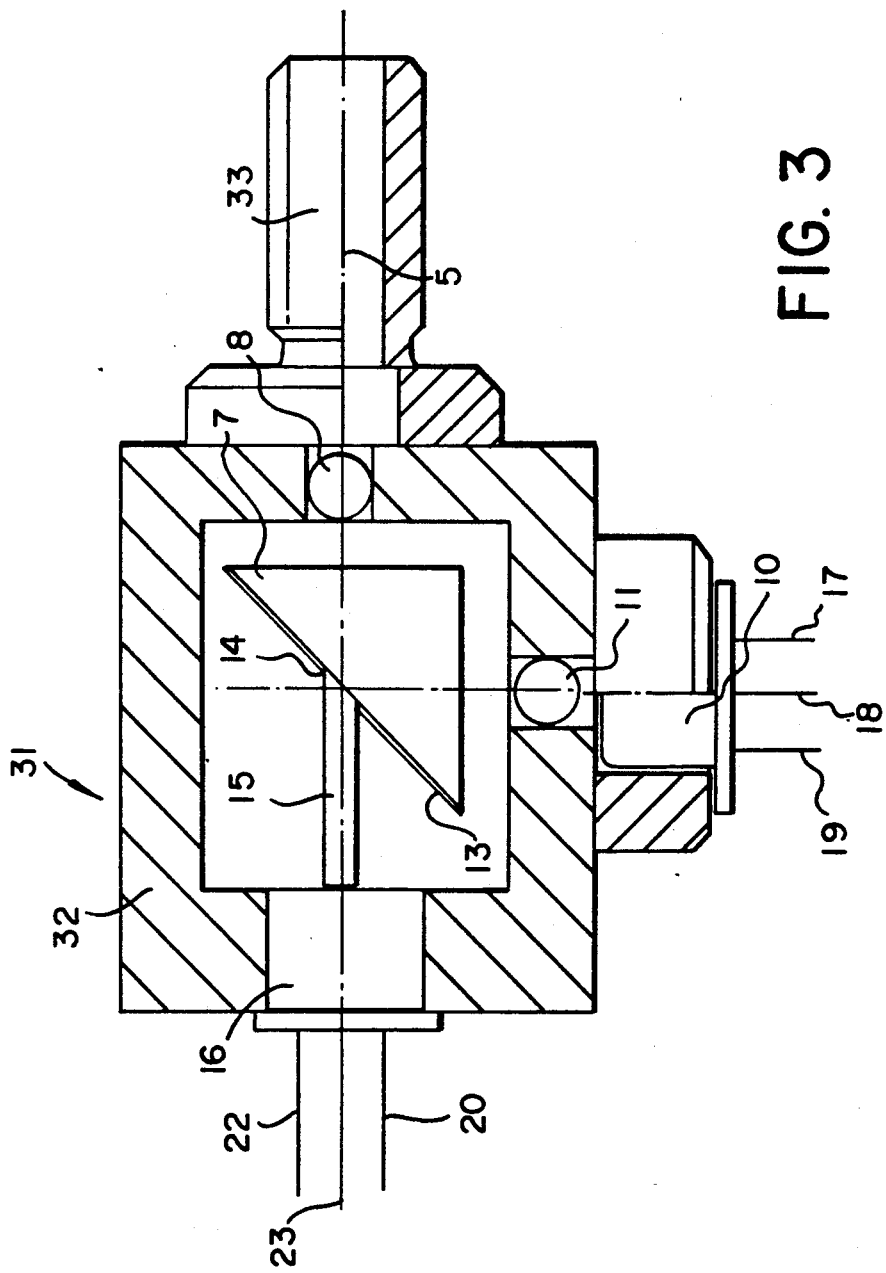
FIG. 3 shows the sender/receiver apparatus housed in a common case for practical applications.

FIG. 3 shows an embodiment of the device schematically illustrated in FIG. 2 such as it may be used as a structural elements in actual practice. The structural elements shown in FIG. 3, which corresponds to those of FIG. 2, are provided with the same identifying symbols and for the sake of clarity are not explained again here.

The optical prism 7 with the reflecting layer 13 and the beam wave guide 15 are located in a case or housing 31. The first and second spherical lenses 8 and 11 and the receiver 16 are located in the case wall 32 Advantageously the lens 8 is located as an optical port of the device. The sender 10 in flanged or connected on the outer surface of the case 31 corresponding to the cathetus surface 9. A plug socket 33 to connect the beam wave guide connecting sector 2, not shown in FIG. 3, is located on the outer surface opposite the receiver 16 at the optical port. FIG. 3 illustrates a compact, robust and sturdy sender and receiving apparatus protecting the individual structural components suitable for practical use.

The invention has been explained by a preferred embodiment. However, those skilled in the art are able to carry out numerous modifications and variants of this example, without exceeding the concept of the invention For example, it is possible to interchange the layout of the sender 10 and the receiver 16. Additionally, the beam wave guide 15 and the second spherical lens 11 may also be interchanged. The scope of the invention is to be construed consistent with the claims appended hereto.

We claim:

1. An optoelectrical sender and receiver apparatus for a beam wave guide connecting sector with a sender and a receiver comprising a mode selective brancher configured to separate bi-directional beams transmitted onto a common beam wave guide connecting sector, wherein said mode selective brancher is at least an optical prism and optical structural elements including a diaphragm and lenses configured to define in part a sender solid angle range and a receiver solid angle range.

2. An optoelectrical sender and receiver apparatus according to claim 1, wherein said sender and receiver solid angle ranges are rotationally symmetric relative to each other.

3. An optoelectrical sender and receiver apparatus according to claim 1, wherein said brancher exhibits a reflecting surface.

4. An optoelectrical sender and receiver apparatus for a beam wave guide connecting sector with a sender and a receiver comprising a mode selective brancher configured to separate bi-directional beams transmitted onto a common beam wave guide connecting sector, wherein said mode selective brancher is at least an optical prism configured to define in part a sender solid angle range and a receiver solid angle range, said optical prism exhibits a reflecting surface with a non-reflecting area.

5. An optoelectrical sender and receiver apparatus according to claim 4, wherein said reflecting surface is a surface with total reflection for at least one incident beam.

6. An optoelectrical sender and receiver apparatus according to claim 5 wherein said optical prism exhibits a cathetus surface facing a sender and a second cathetus surface facing a terminal surface of the beam wave guide connecting sector and where a hypotenuse surface of said prism is facing the receiver.

7. An optoelectrical sender and receiver apparatus according to claim 6, wherein said hypotenuse surface exhibits a reflecting surface with a non-reflecting area.

8. An optoelectrical sender and receiver apparatus according to claim 7, wherein said hypotenuse surface exhibits an aperture for said beam to be received.

9. An optoelectrical sender and receiver apparatus according to claim 8, further comprising a beam wave guide provided between the non-reflecting area of said hypotenuse surface and the receiver.

10. An optoelectrical sender and receiver apparatus according to claim 9, wherein said beam wave guide exhibits essentially the same refractive index as said prism.

11. An optoelectrical sender and receiver apparatus according to claim 9, wherein said non-reflecting area is an aperture.

12. An optoelectrical sender and receiver apparatus according to claim 7, wherein said non-reflecting area is defined by an optical element eliminating the total reflection of the reflecting surface.

13. An optoelectrical sender and receiver apparatus according to claim 6, wherein said optical prism is an isosceles prism.

14. An optoelectrical sender and receiver apparatus according to claim 13, further comprising a lens which converts a beam coming from the sender into an essentially parallel beam located between the cathetus surface facing the sender of the optical prism and the sender.

15. An optoelectrical sender and receiver apparatus according to claim 14, wherein said non reflecting area is coaxial with the essentially parallel beam emitted by the sender.

16. An optoelectrical sender and receiver apparatus according to claim 15, further comprising a lens configured to focus the essentially parallel beam emitted by the sender onto said terminal surface of the beam wave guide connecting sector and to convert a beam received from the terminal surface of the beam wave guide connecting sector into an essentially parallel beam located between the cathetus surface of the optical prism facing the terminal surface of the beam wave guide connecting sector and said terminal surface of the beam wave guide connecting sector.

17. An optoelectrical sender and receiver apparatus according to claim 16 wherein said lens is a spherical lens.

18. An optoelectrical sender and receiver apparatus according to claim 14 wherein said lens is a spherical lens.

19. An optoelectrical sender and receiver apparatus according to claim 6 wherein said optoelectrical sender and receiver apparatus is housed in a common case exhibiting a plug socket for connecting said beam wave guide connecting sector.

20. A beam wave guide optoelectrical sender/receiver apparatus comprising:
  an optical prism exhibiting a reflecting surface arranged on a hypotenuse of said prism, said reflecting surface defining a non-reflecting aperture;
  an optoelectrical receiver aligned with said non-reflecting aperture;
  an optoelectric sender facing said reflecting surface;
  wherein said prism, said sender and said receiver are configured and positioned so that a first beam path is established from an optical port through said prism and said aperture to said optoelectric receiver and a second beam path is established by said reflecting surface from said optoelectric sender through said prism to said optical port.

21. An apparatus according to claim 20 further comprising:
  a first lens located between said optical port and said prism; and
  a second lens located between said sender and said prism.

22. An apparatus according to claim 21 wherein said lenses, said prism and said aperture are configured so that said beam paths are parallel through said prism and define rotationally symmetric solid angle areas between said first lens and said optical port.

23. An apparatus according to claim 22, wherein at least one of said lenses is a spherical lens.

24. An apparatus according to claim 21 further comprising:
  a beam wave guide axially aligned with said optical port and located between said aperture and said receiver.

25. An apparatus according to claim 24 further comprising:
  a housing surrounding said prism and fixing said lenses.

26. An apparatus according to claim 25 further comprising:
  a plug socket connected to said housing at said optical port.

27. An apparatus according to claim 28 wherein said sender and receiver are connected to said housing.

28. A beam wave guide optoelectrical sender/receiver apparatus comprising:
  an optical prism exhibiting a reflecting surface arranged on a hypotenuse of said prism, said reflecting surface defining a non reflecting aperture;
  an optoelectrical sender aligned with said non reflecting aperture;

an optoelectric receiver facing said reflecting surface;
wherein said prism, said receiver and said sender are configured and positioned so that a first beam path is established from an optical port through said prism and said aperture to said optoelectric sender and a second beam path is established by said reflecting surface from said optoelectric receiver through said prism to said optical port.

29. An apparatus according to claim 28 further comprising:
a first lens located between said optical port and said prism; and
a second lens located between said receiver and said prism.

30. An apparatus according to claim 29 wherein said lenses, said prism and said aperture are configured so that said beam paths are parallel through said prism and define rotationally symmetric solid angle areas between said first lens and said optical port.

31. An apparatus according to claim 30, wherein at least one of said lenses is a spherical lens.

32. An apparatus according to claim 29 further comprising:
a beam wave guide axially aligned with said optical port and located between said aperture and said sender.

33. An apparatus according to claim 32 further comprising:
a housing surrounding said prism and fixing said lenses.

34. An apparatus according to claim 33 further comprising:
a plug socket connected to said housing at said optical port.

35. An apparatus according to claim 34 wherein said sender and receiver are connected to said housing.

* * * * *